Patented Jan. 19, 1932

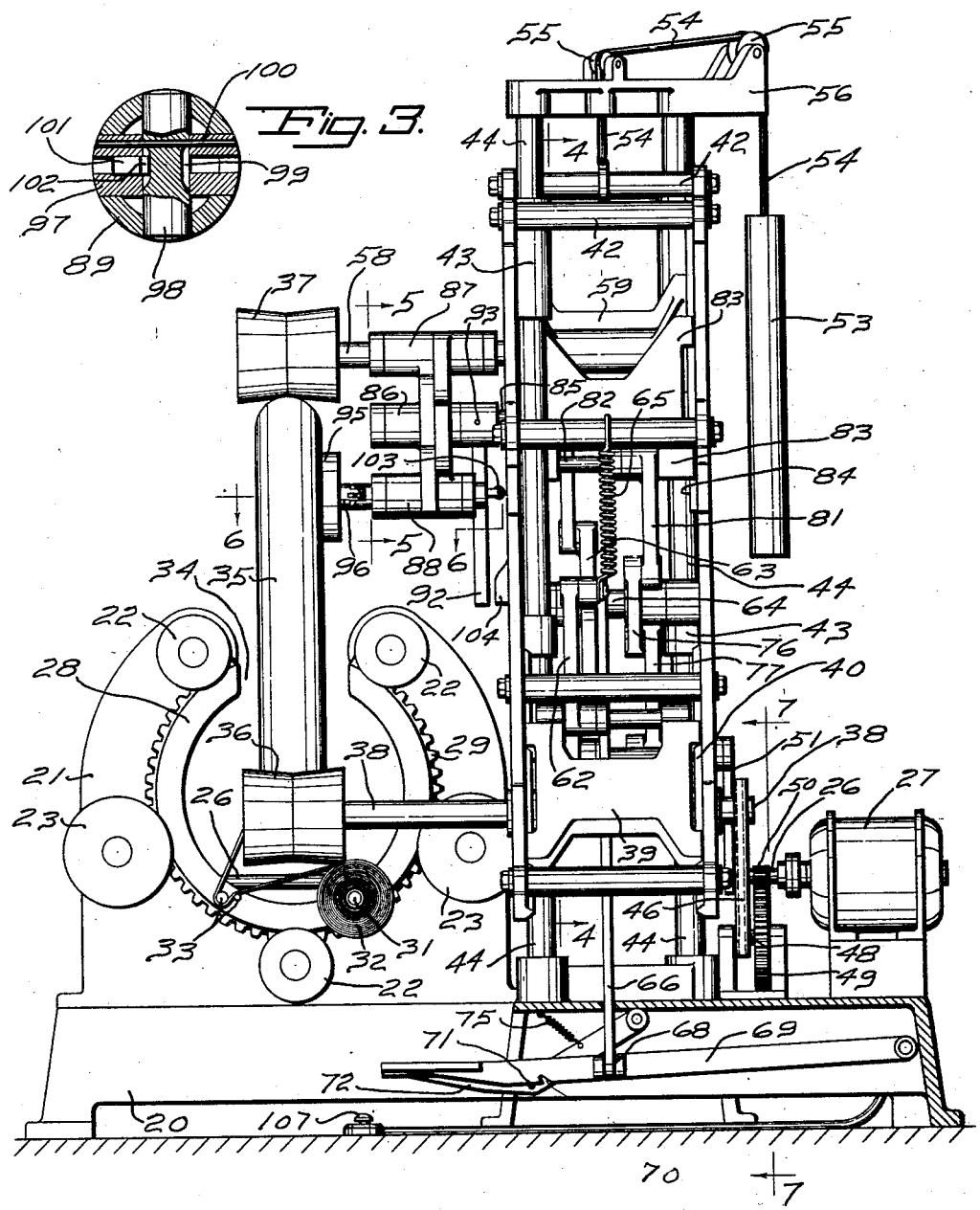

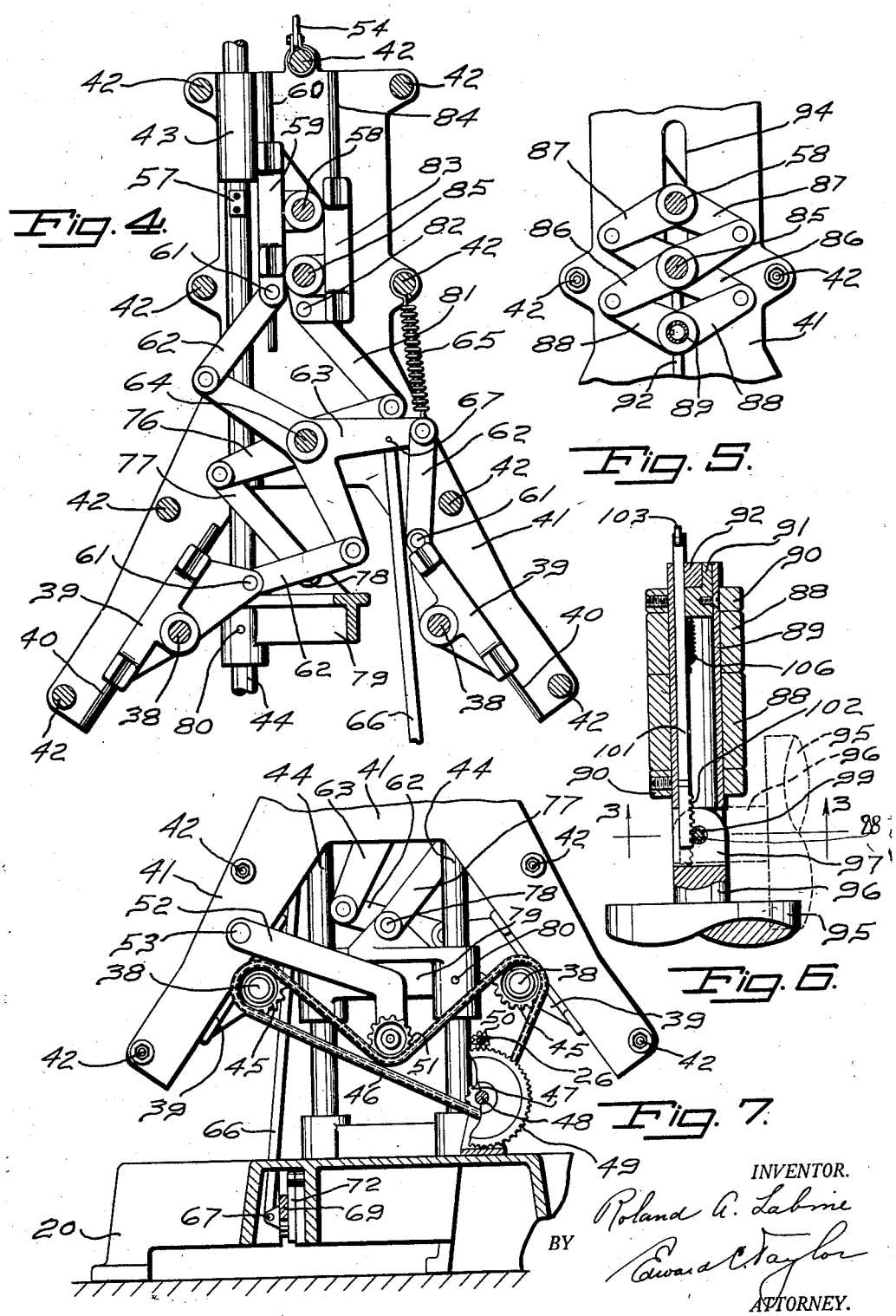

1,841,609

UNITED STATES PATENT OFFICE

ROLAND A. LABINE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

AUTOMATICALLY ADJUSTABLE WRAPPING MACHINE

Application filed November 17, 1927. Serial No. 233,775.

In the wrapping of annular articles such as tire casings it is now customary to use a machine comprising supporting and rotating rolls for the tire and a paper carrying shuttle rotating in a plane at right angles to that of the tire. The relation of the tire supporting rolls and the shuttle must be changed with each change in the size of the tire to be wrapped, since it is necessary that the tire pass centrally through the shuttle in order to secure a uniform wrap and even tension on the wrapping material. As far as I am aware this adjustment has always been made by hand. It is the object of my present invention to provide a machine of this class which will automatically accommodate itself to any size of tire within its capacity, and will center each tire accurately with respect to the shuttle.

Referring to the drawings,

Fig. 1 is a front elevation of a tire wrapping machine embodying my invention, with a relatively small tire placed therein;

Fig. 2 is a side elevation thereof;
Fig. 3 is a section in line 3—3 of Fig. 6;
Fig. 4 is a section on line 4—4 of Fig. 2;
Fig. 5 is a section on line 5—5 of Fig. 2;
Fig. 6 is a section on line 6—6 of Fig. 2;
Fig. 7 is a section on line 7—7 of Fig. 2;
Fig. 8 is a front elevation corresponding to Fig. 1, but showing the machine with no tire in place;

Figure 1:
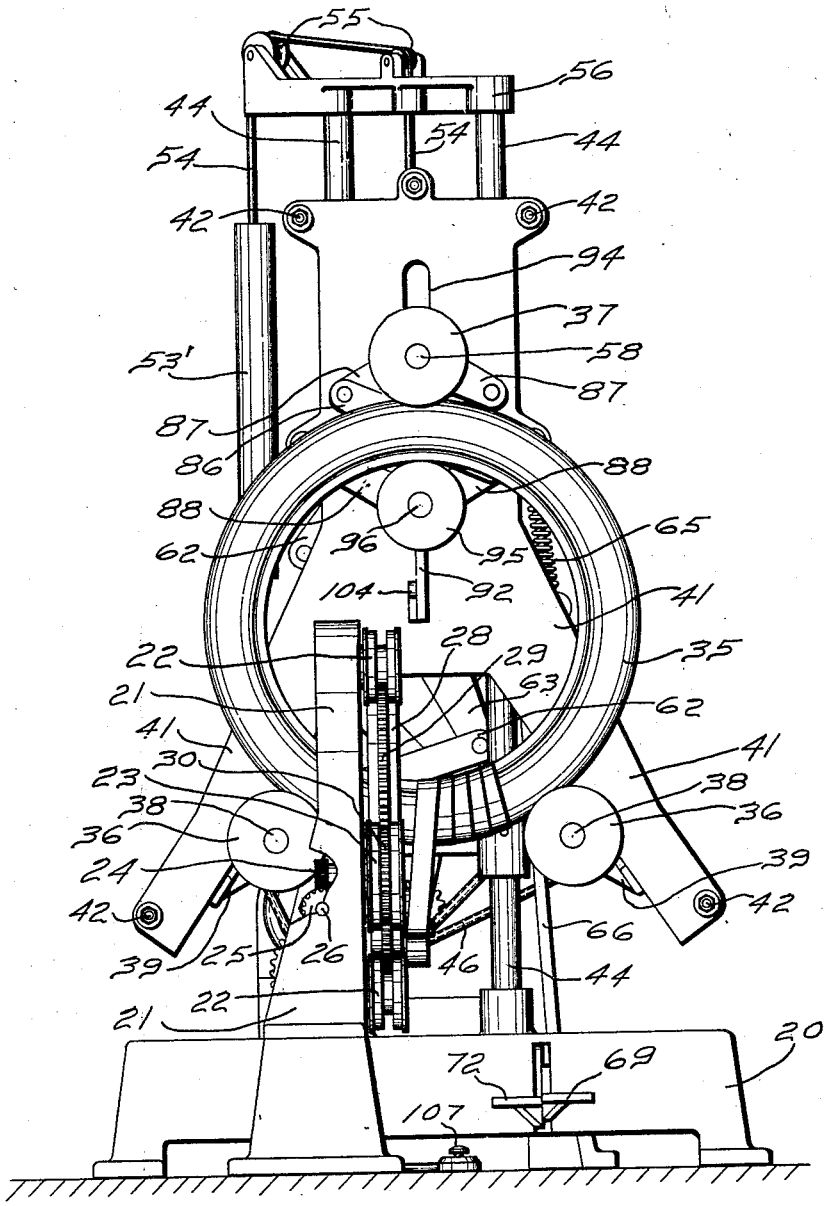

The machine has been shown as mounted on a base 20, from which arises a shuttle carrier 21. Upon this carrier are journaled shuttle guiding rolls 22 and shuttle drive rolls 23. The shafts of the latter are provided with spiral gears 24 meshing with spiral gears 25 on the shaft 26 of an electric motor 27. Guided by the rolls 22 and 23 is a shuttle 28 having a gear 29 on its periphery meshing with gears 30 on the rolls 23. Carried by the shuttle is the usual spindle 31 on which the roll of paper 32 is carried, the paper passing from the roll to the tire over tensioning bars 33. A gap 34 is formed in both the shuttle and its carrier through which the tire 35 may be inserted.

The tire itself is supported on two dished rolls 36 and is held at its top by a dished roll 37. The shafts 38 of the rolls 36 are journaled in and project through brackets 39 slidable in ways 40 formed in a vertical slide composed of parallel plates 41 held spaced by struts 42. Each plate has a bearing 43 embracing one of two posts 44 arising from the base 20. Each shaft 38 carries a sprocket 45 and a chain 46 extends both about these and about a sprocket 47 carried on a shaft 48. This shaft bears a gear 49 meshing with a pinion 50 on the motor shaft 26. A sprocket 51 carried by an arm 52 pivoted at 53 to one of the plates 41 acts as a take-up device to keep the chain always taut.

The weight of the slide and of the tire carried thereby is slightly more than balanced by a counterweight 53' fastened to a rope 54 passing over pulleys 55 on a top piece 56 mounted on posts 44, and secured to one of the struts 42. A stop 57 (Fig. 4) on one of the posts 44 limits the downward movement of the slide by striking against one of the bearings 43. The shaft 58 of the upper roll 37 is carried similarly to shafts 38, on a bracket 59 slidable in ways 60 on the plates 41, the two brackets 39 and the bracket 59 being radially movable with respect to each other. In order to move the three brackets simultaneously and to preserve them equidistant from the common center they are each pivoted at points 61 to links 62 which are in turn pivoted to a three armed lever 63 rotatable on a shaft 64 secured in the slide.

Figure 13:
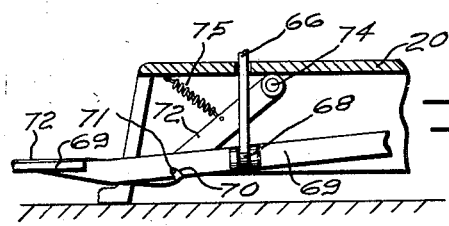
Fig. 13 is a detail corresponding to a portion of Fig. 2, but showing the locking mechanism for holding the machine in open position.

A spring 65, strained between the lever 63 and one of the struts 42 on the slide tends to keep the arm rotated to the left in Fig. 4, or, in other words, to keep the rolls 36 and 37 drawn inwardly. A link 66 is pivoted at 67 to the lever 63 and at 68 to a treadle 69 at the bottom of the machine. By depressing the treadle the slide will be drawn down until the bearing 43 strikes the stop 57—the spring 65 being stronger than the overbalancing action of the counterweight 53'—when the slide stops and the lever 63 is rotated to move the tire holding rolls 36 and 37 radially outwardly. In order to hold the parts in this position the treadle 69 is provided with a slot 70 into which fits a pin 71 (Fig. 13) secured to a treadle 72 pivoted at 74 to the frame and urged upwardly by a spring 75. When treadle 69 is depressed the pin snaps into the slot and holds the treadle down. If the treadle 72 is now depressed the pin is drawn out of the slot and the treadle 69 allowed to rise.

Pivoted on the shaft 64 adjacent the three armed lever 63 is a lever 76 with equal oppositely extending arms. To one of these arms is pivoted a link 77 joined at 78 to a bracket 79 pinned at 80 to posts 44. The pivot 78 is fixed in position and bears a definite relation to the center line of the shuttle as will be shown later. A link 81 connects the other end of the lever to a pivot pin 82 on a cross head 83 slidable in ways 84 on the main slide. A shaft 85 projects from this cross head and supports oppositely angled rocking levers 86 joined by pairs of links 87 and 88 to the shaft 58 of rolls 37 and to a tube 89 respectively.

The hub portions of the two links 88 are held against endwise movement on the tube 89 by collars 90 (Fig. 6). Inside one end of the tube is secured a block 91 into which is cut a groove receiving a squared rod 92 pinned at 93 (Fig. 2) to the shaft 85. This connection preserves the shaft 85 and the tube 89 in vertical alignment and also prevents rotation of the tube. The shafts 58 and 85 extend through a slot 94 in the front plate 41 to their respective cross heads, while the tube 89 stops short of the plate.

A roll 95 is rotatably mounted upon a short shaft 96 having lugs 97 through which passes a pin 98 connecting the shaft pivotally to the tube 89, and permitting the roll to assume either the full or dotted line position of Fig. 6. The central portion of the pin 98 is formed as a pinion 99, and it is secured against rotation in the lugs 97 as by a pin 100. A rod 101 passes through the tube and has sliding bearing in the block 91 and the lugs 97. The end of the rod is formed as a rack 102 meshing with the pinion 99 so that by endwise movement of the rod the roll 95 may be swung about its pivot. This is accomplished by a roll 103 at the end of the rod coacting with a cam plate 104 fastened to the plate 41.

The operation of the apparatus will now be considered. The function of the centering devices, it will be remembered, is the localization of the lower part of the tire annulus in the center of the shuttle. If all tires were either of the same outside diameter or of the same cross-sectional depth (i. e., the radial thickness of the ring), the problem would be relatively easy, but tires vary widely in both these dimensions. The tire being supported by rolls 36 on either side of the shuttle the outside diameter controls the curvature or drop of the tire are between these points, and a centering based on cross-sectional depth alone would not give correct positioning if the outside diameter varies. Conversely, if the outside diameter alone were to control, a setting for one size would become incorrect for a tire of different cross-section.

The underlying principle upon which the illustrative mechanical movement operates is the shifting of the center of the tire so that the distance between that center and the mid-plane of the shuttle is the same as the distance between the center and the mid-point of the cross-sectional depth of the tire at some other point, conveniently the opposite side. By reason of the lazy-tongs connection between the rolls 37 and 95 (levers 86 and links 87 and 88) the shaft 85 is always opposite the mid-point of the tire section when the rolls are in contact with the outer and inner peripheries of the tire respectively. Now the arms of lever 76 being equal, and the links 77 and 81 also being equal, the shaft 64 is always halfway between pivot 82 and the fixed pivot 78. This latter pivot is located the same distance above the mid-plane of the shuttle (shown at 105 in Figs. 10 to 12) as the pivot 82 is below shaft 85. Shafts 38 and 58 being always equidistant from the center 64, the shaft 64 is necessarily opposite the center of the tire when the rolls 36 and 37 are in contact with its outer periphery. Assuming that rolls 36 and 37 are in contact with the tire's outer circumference and roll 95 in contact with the inner circumference, the mid-point of the tire section at the top is opposite shaft 85 and the center of the tire is opposite shaft 64. By the law of operation of the machine, shaft 85 is the same distance from shaft 64 as the latter is from the mid-plane of the shuttle; and the lower mid-point of the tire, being the same radial distance from the tire center (coinciding with shaft 64) as the upper mid-point must coincide with the mid-plane of the shuttle. The action of the machine is geometrically accurate, and is unaffected by changes in the proportions of the tires.

Figure 8:
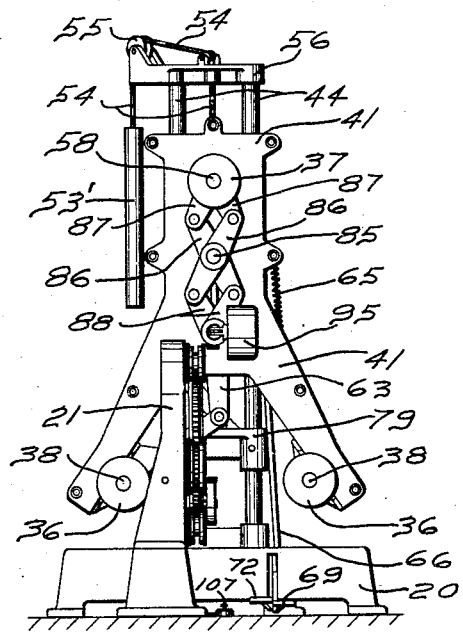
Figure 9:
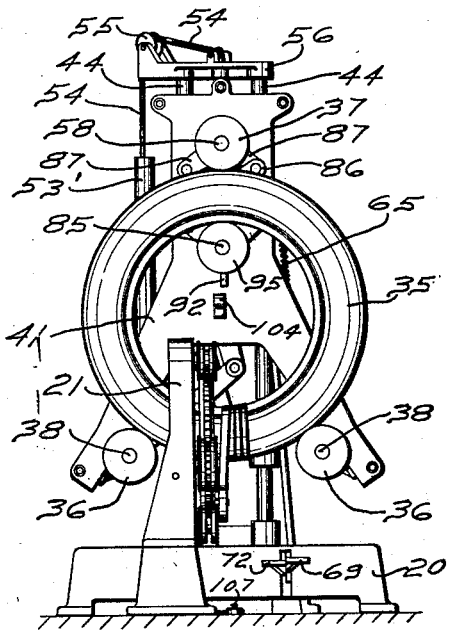
Fig. 9 is a similar view showing a large tire in place.
Figure 10:
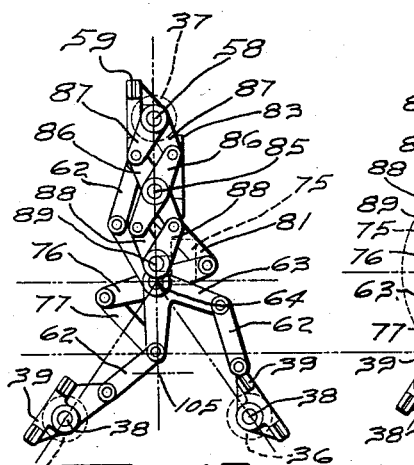
Figs. 10, 11 and 12 are diagrammatic views illustrating the position of the linkage with, respectively, the machine open, a small tire in place, and a large tire in place.

In Figs. 8 and 10 the machine has been shown open. The treadle is down, the slide pulled down to the limit, and the three-armed lever rotated its maximum distance in a clockwise direction. As the slide is drawn down the lever 76, being acted on at one end by link 77 from the fixed pivot 78, moves clockwise, and its right hand end draws the shaft 85 down. The rotation of the three-armed lever pushes the rolls 36 and 37 radially outwardly. The result is to cause a considerable separation between shafts 58 and 85, and through the lazy-tongs connection, between shaft 58 and the tube 89. The lowering of the latter is sufficient to cause roll 103 to strike cam 104 and therefore to rotate roll 95 to a position at right angles to its normal position. It is thus carried out of the way of a tire which may be rolled onto the rolls 36 through the shuttle gap 34.

By depressing treadle 72 the slide is released to travel upwardly under the influence of the counterweight and the three-armed lever 63 is released for counter-clockwise rotation by the spring 65. The strength of the spring is made great enough, and the slide heavy enough, so that the latter action occurs before any substantial upward movement of the slide takes place. The rolls 36, and 37 are then initially brought into contact with the outer periphery of the tire, centering the latter with respect to the shaft 64. The slide then rises under the influence of the counterweight, separating shaft 64 from the fixed pivot 78. By reason of the linkage connecting shaft 64 and this fixed pivot 78 with the shaft 85 the latter is caused to rise with twice the rapidiy of the slide, and to draw the tube 89 upwardly at double its own rate through the lazy-tongs. As soon as the roll 95 commences to rise the cam 103 releases it for return to its normal position under the influence of a spring 106 (Fig. 6), and it continues its upward movement until it strikes the inside of the tire. The slide then stops, and the tire is completely centered. The machine may now be operated for wrapping, a conventional motor control switch 107 being shown for that purpose, and the tire ultimately released by depressing treadle 69.

Figure 11:
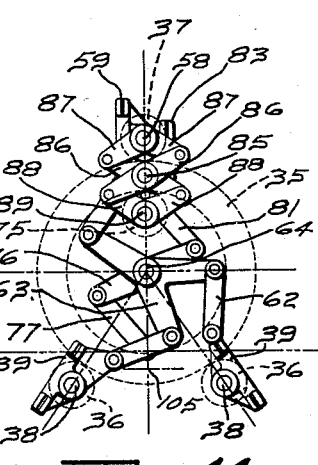
Figure 12:
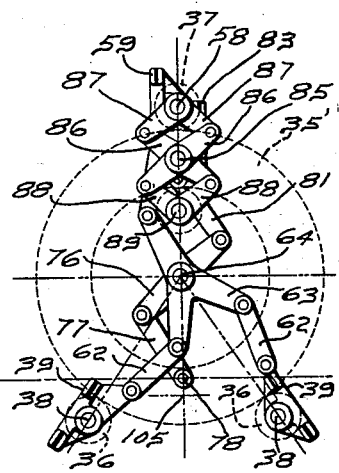

In Fig. 11 the linkage has been shown in the position it assumes with a small tire in position. In Fig. 12 a large tire has been shown in place. It will be apparent from the drawings that the lower mid-point of the cross-section comes directly opposite the mid-plane 105 of the shuttle in either case. The action is purely automatic, requiring no attention on the part of the operator as to what size of tire he has placed in the machine. Many changes may obviously be made in the mechanical structure without departing from the scope of the invention as defined in the appended claims. For example, the cross-sectional width of the tire might be made a basis of control instead of the cross-sectional depth, the cross-sectional control mechanism might be located otherwise than on the same diametrical line with the center of the shuttle, or the shuttle moved together with or intead of the tire in making the adjustment.

Having thus described my invention, I claim:

1. A tire wrapping machine comprising a tire wrapping shuttle, tire supporting means, means for centering a tire with respect to the tire supporting means and mechanism responsive to the cross-sectional size of the tire to shift the center of the tire supporting means with relation to the shuttle.

2. A tire wrapping machine comprising a tire wrapping shuttle, a plurality of rolls adapted to engage the periphery of a tire to be wrapped, means constraining said rolls for simultaneous radial movement toward and from the tire, a roll adapted to engage the inner circumference of the tire and mechanism controlled by said roll for shifting the first mentioned rolls as a unit to center the tire in the wrapping shuttle.

3. A tire wrapping machine comprising a wrapping shuttle, a slide movable relative to the shuttle, a plurality of tire engaging rolls carried by the slide, means to simultaneously move said rolls radially toward and from a tire to be wrapped and mechanism responsive to the cross-sectional size of the tire to move the slide relative to the shuttle to center the tire in the wrapping shuttle.

4. A tire wrapping machine comprising a wrapping shuttle, a slide movable relative to the shuttle, a plurality of rolls simultaneously and radially movable on the slide and adapted to engage the periphery of a tire to be wrapped, a roll adapted to engage the inner circumference of the tire and mechanism controlled by said roll for shifting the position of the slide to center the tire in the shuttle.

5. A tire wrapping machine including tire wrapping shuttle means, means for supporting a tire in position to be wrapped by the shuttle, at least one of said means being mounted for relative movement with respect to the other, and means controlled by the size of the tire placed in the machine to cause a relative movement between the shuttle means and the tire supporting means to position the tire in predetermined relation with respect to the shuttle means.

ROLAND A. LABINE.